W. H. TEETSOW.
BALL BEARING.
APPLICATION FILED DEC. 18, 1919.

1,379,945. Patented May 31, 1921.

WITNESSES:
G. L. Gema
J. C. Ledbetter

INVENTOR
Waldemar H. Teetsow
BY Munn & Co
ATTORNEYS

UNITED STATES PATENT OFFICE.

WALDEMAR H. TEETSOW, OF NEW YORK, N. Y.

BALL-BEARING.

1,379,945.  Specification of Letters Patent.  Patented May 31, 1921.

Application filed December 18, 1919. Serial No. 345,781.

*To all whom it may concern:*

Be it known that I, WALDEMAR H. TEETSOW, a citizen of the United States, and a resident of New York, in the county of New York, borough of Manhattan, and State of New York, have invented a new and Improved Ball-Bearing, of which the following is a full, clear, and exact description.

This invention relates to ball bearings and particularly to ball bearings having annular races made in sections separable one from the other.

It is a particular object of my invention to provide a new and novel type of ball bearing capable of taking radial loads, combined radial and thrust loads, and end thrust loads impressed from either direction to enable the use of my bearing on all types of machinery where it becomes necessary to provide adequate bearing facilities to care for the variety of load conditions imposed on bearings.

It is a further object and a distinctive purpose of my invention to produce a ball bearing having the facility of being correctly assembled, either permanent and unitary in structure, or capable of being disassembled, and which, when assembled in a machine it will be non-adjustable, which makes for the positive alinement and accuracy in fit of the several elements constituting the bearing.

It is a further and broad purpose to provide a positive locking means for holding the separable raceway sections together.

It is an object to provide a ball bearing which may be readily disassembled by withdrawing one of the separable sections from the bearing to insert a new section or new balls when making repairs or restoring the bearing to its normal functioning capacity.

Also it is an object to make a bearing which may be taken apart to grind down parts thereof when the bearing becomes worn, in order that the balls may again fit the race and function as a new bearing.

It is a further purpose to produce a ball bearing easy to manufacture, highly accessible in its assembly and disassembly in order that it may be readily and conveniently inspected.

Figure 1:
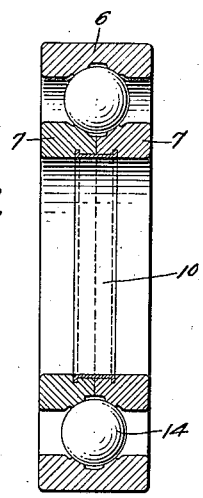
Figure 2:
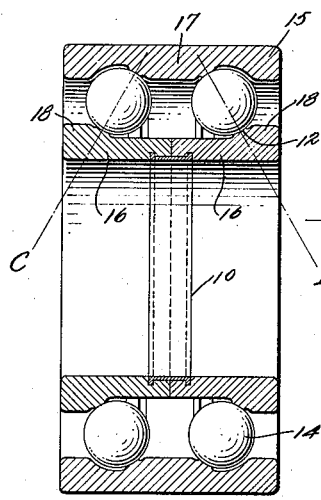
Figure 3:
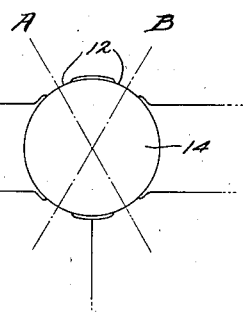
Figure 4:
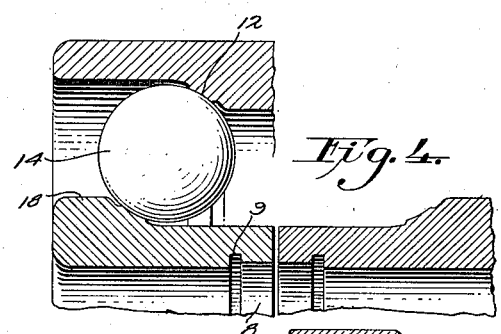
Figure 5:
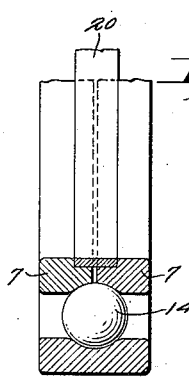
Figure 6:
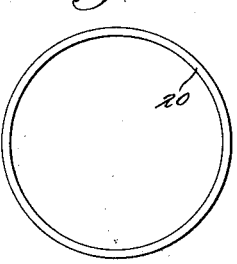
Figure 7:
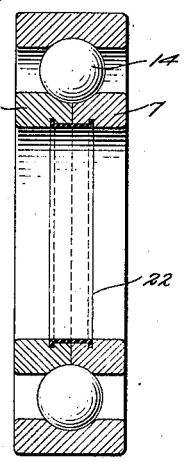

With the above and other objects in view, the invention has relation to the ball bearing design and conception as outlined in the following specification, depicted in the several definitions set forth in the appended claims, and illustrated in the accompanying drawings, wherein:

Figure 1 illustrates a cross sectional view taken through a single row bearing made in accordance with one of the principles of my invention, Fig. 2 is a view showing a double row bearing having similar characteristics of construction, Fig. 3 is a diagrammatic view of a ball in the races showing the relation and design of bearing parts, Fig. 4 portrays a fragmentary view of the double row bearing to show the separable race sections slightly spaced apart to facilitate the understanding of the manner of locking the separable sections together, Fig. 5 shows a fragmentary view employed to illustrate a certain type of retaining ring used to hold the parts together, Fig. 6 shows the retaining ring in side elevation, Fig. 7 illustrates another form of retaining ring used for the purpose of locking the separable race sections together where the working conditions are somewhat different from the working conditions characteristic of the use of that retaining ring shown in Figs. 5 and 6.

A ball bearing constructed in accordance with the principles of my invention employs the ordinary inner and outer radial raceways for maintaining the balls and for transmitting the loads imposed thereon from one raceway to the other raceway through balls confined between the raceways. The novel features of my invention will be disclosed in more detail in the following specification.

An outer raceway 6 and an inner raceway is provided comprising separable raceway sections 7. It is apparent to engineers conversant in the art that either of the raceways might be made in sections, but in the present illustration I have chosen to disclose the inner raceway split through the center thereof to form the two separable sections 7.

The sectional raceway is provided with an annular channel 8 cut in the adjacent sections 7 to form one complete channel when the two sections are joined together. A groove 9 is cut adjacent the channel 8 in each section to form what may be called a combination channel 8 with the adjacent groove 9. It is seen, therefore, that when the sections 7 are joined together the combination channel 8 and groove 9 form an annular grooved depression in the raceway 7 for the reception of a lock ring to positively lock the parts together.

A locking ring 10 comprises a channel member equal in cross section to the channel and groove formed in the raceway sections. The channeled locking ring 10 is necessarily made of a suitable spring material and is cut to form an open ring in order that it may be snapped into the channel 8 and groove 9 of the sectional raceway. When the two raceways 7 are brought adjacent one the other, the channeled locking ring 10 may be snapped into position by pressing its ends inwardly until the ring will pass into the internal bore of the inner race and expansively engage the groove of the race to positively lock the sections 7 together.

The ball grooves or races are made in the outer and inner raceways 6 and 7 in accordance with the best principles of ball bearing engineering practice to insure accuracy in ball and race contact. Contact ribs, or ball tracks 12 are raised in the ball grooves to provide a rib or track on which the balls 14 roll. Each race is provided with one or more ribs spaced apart to contact the ball. It is seen, therefore, how the ball is carried on each race slightly spaced away from the groove of the race and adapted to roll on the tracks 12. Where the tracks 12 are spaced apart there is formed an angular disposition of mount or carrying capacity between the raceways and the ball; that is to say the tracks 12 are coincident with a line drawn at an angle with the axis of rotation of the ball bearing.

This spaced arrangement of the ball tracks 12 is brought out in Fig. 3 where the lines A and B are drawn at an angle through the center of the ball, and it is noted that the tracks 12 are cut by the diagram lines A and B. The lines A and B therefore designate the direction of the force impressed on the ball bearing during the time the bearing is working under load. It is noted, therefore, that the radial load imposed on the ball is transmitted from one race to the other through the ball tracks 12, the said forces acting at an angle to the axis of rotation of the bearing. This arrangement provides for an accurate transmission of a radial load through the bearing, likewise provides for the proper distribution of end thrusts transmitted to the ball bearing from either direction. When an end thrust is imposed upon the bearing the oppositely-disposed outside tracks 12 take up the end thrust and transmit it to the ball; and likewise when a combined radial thrust load is imposed on the bearing both moments distribute themselves to the ball through the tracks 12.

Referring now more particularly to Figs. 2 and 4 there is pointed out a double-row, or multi-row ball bearing comprising the outer race 15 and inner sectional race 16. The outer race 15 is provided with an annular rib 17 raised in the raceway to act as a separator of the rows of balls 14 to constrain the balls in proper rotational movement. The inner raceway is made in sectional form comprising the two joined sections 16 as hereinbefore explained. Each section 16 is provided with a peripheral rim 18 acting to hold the balls in the raceways. As heretofore explained, ball tracks 12 are raised in the two raceways to provide a contact rib along which the balls travel around the raceways.

The angular disposition of the ribs 12 of the two raceways 15 and 16 is somewhat different in this latter form of bearing from the single row bearing as hereinbefore described. In the multi-row bearing the diagrammatic lines C and D show the point of contact between the balls and the raceways. The lines C and D are generated at an angle to the axis of rotation of the bearing and pass through the ball tracks and the balls. It is seen, therefore, how a load imposed on one raceway is transmitted to the other raceway along the lines C and D which equally distribute the strains and forces incident to a radial load. The bearing likewise has the remarkable facility of adequately taking up end thrusts, for when an end load or stress is imparted to either of the raceways of this bearing the stress is transmitted from one raceway to the other through the balls at an angle to the direction of applied stress. The bearing therefore accommodates end thrusts occurring from either direction for when the thrust is applied to either raceway, one of the series of balls confined between the rib 17 and peripheral rim 18 will take up the load. Likewise, a combination radial and thrust load is readily taken up by the double row of ball bearings since either one of the load factors are transmitted from one race to the other through the lines C and D.

This type of bearing has the convenient facility of being quickly and easily disassembled. In many instances the locking ring, which is disclosed as a primary feature of my invention, will not be employed since a collar or other means is usually made on shafts for holding the sectional race together, thus eliminating the necessity of the locking means 10. Where the locking ring 10 is not employed the bearing may be dismantled on the shaft and new balls inserted, or even a new section 7 or 16 inserted without tearing down the machine upon which the bearing is mounted. The removal of the section 7 or 16 only requires the withdrawal of that section from the bearing for inspection or repair.

Referring now more in particular to Fig. 5, it is noted that the sections 7 are slightly spaced apart, and are held in spaced relation by the retaining ring 20. When the ball track in the races has become worn to the degree that looseness exists in the fit of the bearing parts, the sections 7, may then be taken apart and the retaining ring 20 ground down so that less space is left between the sections 7 when the bearing is reassembled. In this way the life of the bearing may be prolonged.

Referring further to Figs. 5 and 6 there is shown a solid retaining ring 20 employed for the purpose of holding the race sections together while handling the bearing or carrying the bearing from one place to another. It is seen how a bearing of this type will not necessarily need a locking ring as shown in Figs. 1 and 2 as the bearing is often inserted between collars on a shaft, which act to hold the sections 7 or 16 together. However, it is necessary to employ a retaining ring for temporarily holding the bearings sections together at the time the bearing is assembled in a manufacturing plant. This ring 20 fits into the adjacent grooves of ring sections 7 tight enough to hold the sections together due to frictional engagement. The ring 20 is therefore employed merely for the purpose of holding the bearing together for shipment and while installing the bearing in a machine. This ring is preferably made solid but it may be split.

There is shown still another type of ring in Fig. 7. This ring is formed with a flange on each rim and channeled in cross section similar to the design of the locking ring 10, shown in Figs. 1 and 2. The locking ring 22, however, is not cut to form an open ring such as the ring 10, but is made in the form of a solid ring similar to the one shown in Fig. 6. The ring 22 is specially designed to be made of lead, copper, or, in fact, any dovetail and malleable metal which may be run or hammered into the channel grooves 8 and 9. After the material is forced into place to lock the race sections 7 together there is no particular way of removing the locked ring 22 other than by gouging it out with a tool which destroys the ring. This form of solid locking ring 22 constructed of soft metal is employed for the purpose of permanently assembling a bearing where it is unlikely that it will be taken apart for repair.

Having thus described my invention, what I claim as new and desire to secure by Letters Patent is:

1. A ball bearing comprising an outer member of solid construction provided with spaced annular grooves defining a central rib, the opposite side faces of which serve to seat and separate two rows of anti-friction balls, an inner member including a pair of mating sections having radial annular ribs, the confronting faces of said ribs defining bearing shoulders adapted to co-act with the anti-friction balls to retain the same against the central rib of the solid member, and a temporary locking ring adapted to co-act with the sections of the sectional member to retain the same against relative separation, said ball bearing in its entirety when arranged in a hub or housing, constituting a means for absorbing the radial or thrust loads, or the combined radial and thrust loads, whereby said loads may be transmitted respectively through the bearing members and the anti-friction balls without passing through the locking ring.

2. A ball bearing comprising a solid raceway having a central bearing rib, adapted to separate and seat a double row of anti-friction balls, a sectional raceway comprising a pair of mating sections having outer annular rims, constituting means for seating and confining said anti-friction balls against the center rib when the sections are brought together, said sections being axially separable to admit of the introduction or removal of the balls, and a temporary locking ring co-acting with said separable sections to retain the same against relative separation during the assembly of the bearing in a hub or housing.

WALDEMAR H. TEETSOW.